May 21, 1940.   H. C. BOSTWICK   2,201,471
ROD PACKING
Filed April 4, 1938
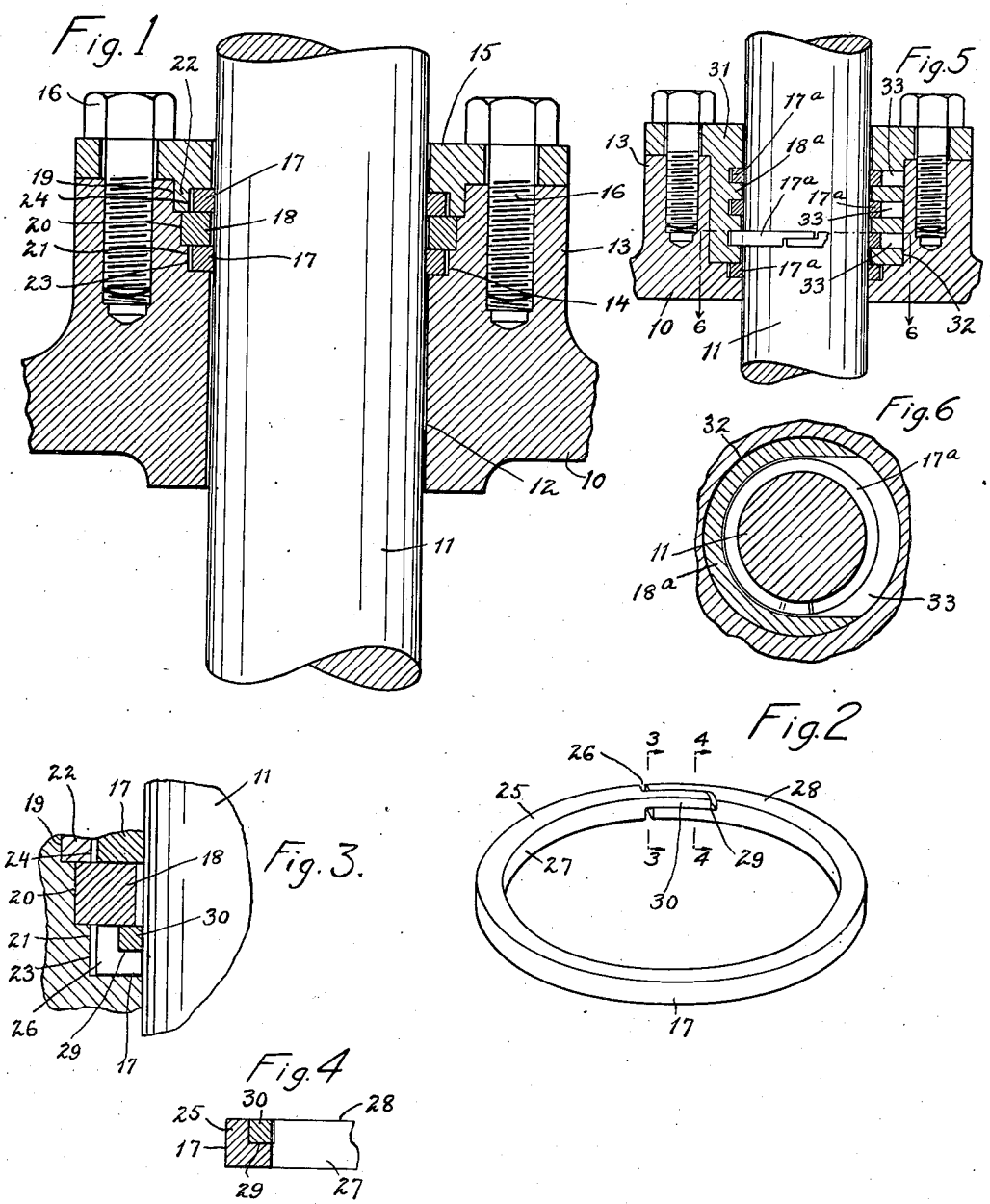
Inventor,
H. C. Bostwick,
By Robert M. Pierson,
Attorney Patented May 21, 1940

2,201,471

UNITED STATES PATENT OFFICE 2,201,471

ROD PACKING

Henry C. Bostwick, Coventry Township, Summit County, Ohio, assignor to The Akron Standard Mold Company, Akron, Ohio, a corporation of Ohio Application April 4, 1938, Serial No. 199,780

2 Claims. (Cl. 286—39)

This invention, relating to packed rod and shaft joints, has for its object to provide a simple, durable, substantially leak-proof, metallic packing for joints such as those between a cylinder head and a sliding rod or plunger, and for use in any other situation to which it may apply.

Notwithstanding the long-existing need for such a device, for example on ram cylinders and analogous structures employing oil as a pressure medium, the leakage of which is wasteful and otherwise objectionable, no thoroughly satisfactory metallic rod packing has existed prior to this invention, so far as I am aware.

Of the accompanying drawing, Fig. 1 is a longitudinal, vertical section showing portions of a piston rod and cylinder head having a metallic packing embodying my invention in a preferred form.

Fig. 2 is a perspective view of one of the packing rings.

Fig. 3 is an enlarged detail longitudinal section of one side of the assembly, taken through the lower ring on line 3—3 of Fig. 2.

Fig. 4 is an enlarged detail section on line 4—4 of Fig. 2.

Fig. 5 is a longitudinal section and Fig. 6 a cross section on line 6—6 of Fig. 5, showing a modification.

In the drawing, 10 is the head of a casing such as the power cylinder of an oil ram or any analogous structure, having a pressure chamber on its lower side, in which may operate a piston (not shown), and 11 is a rod or shaft, such as a piston rod, or part of a plunger, slidable through an opening 12 in the head. An annular boss or projection 13 on the head, formed with a rod-surrounding chamber designated generally at 14, constitutes a housing for the packing, closed at its outer end by a ring 15 which is detachably secured to the boss by cap screws 16. This ring somewhat resembles a gland, but has only a confining and not a squeezing action in relation to the packing.

The chamber 14 may contain one or more metal packing rings 17, two being here shown, separated by an endless metal spacer ring 18 whose bore is slightly larger than the size of the shaft 11. The surrounding wall of the packing chamber is cylindrically step-bored in three different sections 19, 20, 21, of downwardly decreasing respective diameters, the upper or largest bore 19 receiving a short cylindrical flange 22 which projects downwardly from the body of the retaining plate 15. The bore 20 of intermediate size receives the spacer ring 18 and the lower bore 21 of smaller size receives the lower packing ring 17, in a rectangular groove 23 formed between the circumference and bottom of said bore and the bottom of ring 18. The upper packing ring 17 is received in a similar, reversed, rectangular groove formed between a bore 24 within the plate flange 22, having the same diameter as bore 21, and the top end wall of said bore and top face of spacer ring 18. All horizontal faces of these parts are in parallel planes normal to the axis of rod 11, and all vertical faces are cylindrical. The spacer ring 18 is preferably held tightly between the bottom of flange 22 and the bottom of bore 20, and the packing rings 17 have a limited radial movement in their grooves, permitted by very small clearances between their top and bottom faces and the adjoining faces of the grooves.

Each of the packing rings 17 is of a character shown as a whole in Fig. 2 and partly shown in the other views. For rod packings, the ring is preferably composed of a stiff metal, such as cast iron, slightly elastic, and comprises an annulus body 25, trans-split as 26 and formed at one end, adjacent to the cylindrical inner periphery 27 and one adjoining flat face 28 thereof, with a longitudinally extending groove 29 of rectangular or L-shaped section as shown in Figs. 3 and 4. From the other end of the annulus body projects a gap-bridging tongue 30, which may be formed as a separate piece, brazed or otherwise permanently secured to the body on a lapping joint so as to become integral therewith, and slidingly mounted in the groove 29. The inner peripheral face of this tongue is continuous with the inner peripheral face 27 of the annulus body, and it and the groove 29 are formed with complemental flat and cylindrically arcuate faces in overlapped sliding contact, respectively parallel with the plane and with the central axis of the ring. Each of the rings 17 is normally of slightly smaller internal circumference than the outer circumference of the rod 11, so that the ring must be expanded to get it on the rod, and then grips the latter with a contractile tension.

In assembling this packing upon a rod 11 projecting through the aperture 12 in the casing or cylinder head 10 and through the open-packing chamber 14, the lower packing ring 17 is first applied to the rod, at the proper place thereon and seated at the bottom of the smallest bore 21, the spacer ring 18 is next applied and seated in the bore 20 of intermediate size, the upper packing ring 17 is then applied to the rod, against the spacer ring, and finally the retaining ring 15 is applied to the boss 13 and drawn down by the screws 16 with its flange 22 in the largest bore 19, so that the lower end of said flange will clamp and hold the spacer ring 18 in place. The packing, when properly fitted, effectively seals the rod 11 against substantial escape of fluid pressure from the cylinder or other casing chamber under the head 10, the sealing being improved as the inner surfaces of the rings 17 wear down slightly against the rod. The effectiveness of the seal is greatly promoted by the presence of the tongue 30 at the inner periphery of the ring body, overlapping about one-half of the depth of the gap 26 and slidable in overlapped relation to adjoining faces of the groove 29.

As will be seen for the lower ring 17 in Fig. 3, the top of the gap 26, on a rising movement of rod 11, when leakage under the ring presses its top face against the bottom face of spacer ring 18, is thereby closed by the endwise pressure, and said gap is otherwise closed at the inner periphery of the ring by the presence of the tongue 30, underlapping upon the spacer ring. Pressure getting under the packing ring and through the gap 26, acting radially inward against the outer periphery of the ring, whose area is greater than that of the inner periphery, exerts a differential inward radial pressure which tends to hold the ring 17 more tightly against the rod 11. A similar action exists with the upper packing ring 17, as to any pressure fluid escaping past the lower one. The resulting fluid tightness of the rod joint is highly advantageous when oil is used as the pressure medium, in preventing waste and loss of efficiency and the fouling of floors, and avoiding or reducing the necessity for providing drainage, and is also highly useful for other fluids.

The modification shown in Figs. 5 and 6 employs a series (four in this instance) of trans-split, elastic, metallic, contractile packing rings 17ª having ordinary lapped end joints, and a surrounding gland-like cage 31 fitted in a central bore 32 of the cylinder head, over the lowermost packing ring of the series. Said cage is integrally formed with inwardly-extending spacer rings 18ª, between the packing rings, and the three upper packing rings are insertible and withdrawable, before assembling the packing unit with the cylinder and piston, through slots 33 in a side wall of the cage, between said spacer rings.

It will be understood that various other changes of embodiment may be made within the scope of the claims, and the invention may be employed for other uses than rod packing, as, for example, to pack rotary shafts of pumps and other apparatus.

I claim:

1. A packing assembly comprising a casing head having a rod bore and a packing chamber with a circumferential wall step-bored in at least three diameters larger than the rod bore, to form partial packing-ring grooves and an intermediate spacer ring seat, a rod extending through said chamber, a trans-split, elastic, metal packing ring of the bridged-gap, tongue-and-groove type, in a smaller bore of said chamber, a detachable retaining ring on said head, having a flange in the largest bore of said chamber, and an internal ring bore, a similar packing ring in the last-said bore, and an endless spacer ring seated in an intermediate bore of said chamber, and held by said flange against endwise movement.

2. A packing assembly comprising an outwardly cylindrical cage inwardly formed with a pair of axial sealing faces and an intermediate packing-ring groove extended in a slot which is closable on the outside by endwise insertion of the cage in a complemental rod chamber, and a trans-split, contractile, rod-packing ring insertible and removable through said slot.

HENRY C. BOSTWICK.